(No Model.)
F. E. BALDWIN.
SPROCKET AND CHAIN GEARING.
No. 593,714. Patented Nov. 16, 1897.
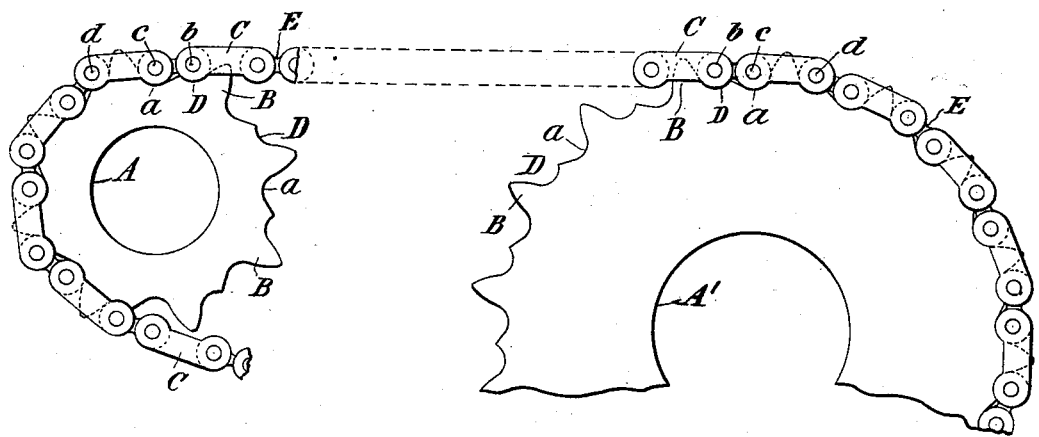
Witnesses:
Raphael Netter
Edwin B. Hopkinson
Frederic E. Baldwin, Inventor
by Kerr, Curtis & Page, Att'ys

UNITED STATES PATENT OFFICE.

FREDERIC E. BALDWIN, OF NEW BRIGHTON, NEW YORK.

SPROCKET-AND-CHAIN GEARING.

SPECIFICATION forming part of Letters Patent No. 593,714, dated November 16, 1897.

Application filed January 11, 1897. Serial No. 618,903. (No model.)

*To all whom it may concern:*

Be it known that I, FREDERIC E. BALDWIN, a citizen of the United States, residing at New Brighton, in the county of Richmond and State of New York, have invented certain new and useful Improvements in Sprocket-and-Chain Gearing, of which the following is a specification, reference being had to the drawing accompanying and forming a part of the same.

My invention is an improvement in sprocket-and-chain gear, more especially adapted for use on bicycles and other velocipedes, but applicable generally to other purposes for which such devices are employed.

The nature of the improvement which constitutes the subject of my present application will be understood from the annexed drawing, which represents a side view of my improved sprocket-and-chain gear, and the accompanying description.

In all ordinary sprocket-wheels, whether driving or driven by a chain composed of open or side links and solid or center links, there is a serious loss of power due to friction between the solid or center links which occupy the interdental spaces and the periphery of the wheel. This friction occurs at points immediately adjacent to each tooth and on the side thereof opposite to that upon which the pull or stress between sprocket and chain is exerted, and which for convenience may be considered as being in front of the teeth or adjacent to their idle faces. This is due to the fact that twice the peripheral surface or edge of the sprocket-wheels conforms practically to a circle from which the teeth project radially. The ends of the solid links of the chain not only rest but fulcrum upon the periphery of the sprocket, the ends which lie over the points immediately adjacent to the idle faces actually turning about their pivotal connections with the open or side links while in such contact with the sprocket. This action wears out depressions in the sprocket at the points indicated, which are easily observable in every sprocket of this kind after even a comparatively short period of use. It will be understood that the points of wear or rubbing friction with relation to the teeth are determined by the direction of the applied power, so that in the case of a bicycle-gear the wear upon the sprocket when the rider back-pedals is on the opposite side of the teeth to that occasioned by propelling the wheel forward, but still it will be, considering the direction of pull, in front of the teeth. This wear in back-pedaling may not be disadvantageous, however, as it assists in arresting the forward movement of the wheel.

To obviate the wear occasioned by the forward propulsion of the wheel and the consequent loss of power due to friction sprockets have been devised in which seats or supports were formed or provided for the chain which maintained the solid or center links out of contact with the periphery of the wheels at the points of rubbing friction. The first means devised for accomplishing this purpose of which I am aware was to provide seats around the wheel for the ends of the center or solid links back of or adjacent to the working faces of the teeth by inclining the interdental portions of the periphery from the said working faces toward the idle faces of the next teeth. With such a construction of sprocket there will be practically no tendency of the center or solid links to turn with reference to the open or side links at any point where they are held by the tension of the chain in contact with the sprocket, the relative movement between the members of the chain being confined to the turning of the open links with reference to the solid links, except, of course, at the points where the chain leaves the driving or reaches the driven sprocket and where it is not under tension.

If the plan be followed of cutting the sprocket in such manner that supporting-surfaces for those ends of the solid links which receive or apply the pressure are provided immediately back of the several teeth, while the remaining interdental portions of the periphery are cut away, so as not to afford fulcrum-support for the center links, loss of power will be avoided in the direct propulsion of the wheel or vehicle, but the wear incident to friction caused by reversing the direction of the propelling force will still be present. My present improvement resulted from the discovery that this latter characteristic of such sprockets may be increased and utilized to advantage in some applications of the invention, as in bicycles, by cutting or forming the sprockets with supporting-surfaces back of the teeth, inclined from the working faces of the teeth outwardly or away from the center of the wheel.

This improvement is illustrated in the accompanying drawing, which I now proceed to describe.

A represents a driven and A' a driving sprocket-wheel, the normal direction of applied force being assumed to be such as to cause the upper fold of the chain to travel from left to right. The chain is composed of open or side and solid or center links pivoted together alternately, the solid or center links being those which fall in the interdental spaces of the wheel. The wheels are formed or provided with ledges or shoulders D, immediately back of the teeth B or adjacent to the working faces thereof, and said ledges or shoulders are hollowed out or otherwise formed so that their bearing-surfaces incline away from the bases of the adjacent teeth outwardly or away from the center of the wheels. The remaining portions of the periphery of each wheel between the teeth not occupied by the ledges D are cut away, as shown at $a$, to afford recesses in which the ends of the solid links will lie without touching or bearing on the edge of the wheel. The side links or those which embrace the teeth B are designated by C, and the center links or those which fall in the interdental spaces are designated by E. These links are pivoted together by the pins $b\ c\ d$. In such a form of gear, when the direction of applied or transmitted power is reversed, any tendency of the solid links to ride up the sides of the teeth forces those ends which rest upon the ledges or shoulders D over the inclined portions of the ledges, and this has a similar effect to increasing the diameter of the sprockets and thereby tightening the chain.

What I claim is—

The combination of a sprocket-wheel and a sprocket-chain composed of open and solid links, the solid links entering between the teeth and the wheel being formed or provided between each two teeth with a supporting-surface immediately in the rear of or adjacent to the working face of one tooth for one end of the solid link, which surface inclines from the said tooth outwardly or away from the center of the wheel, and with the remaining parts of the periphery between the teeth cut away or relatively lower than the said supporting-surface for the reception of the other end of the solid link without affording fulcrum-support for the same.

FREDERIC E. BALDWIN.

Witnesses:
M. LAWSON DYER,
EDWIN B. HOPKINSON.